Sept. 26, 1944.  G. N. HANSON ET AL  2,358,803
TEMPERATURE COMPENSATED BAROMETRIC CONTROLLER
Filed Oct. 30, 1940  2 Sheets-Sheet 1
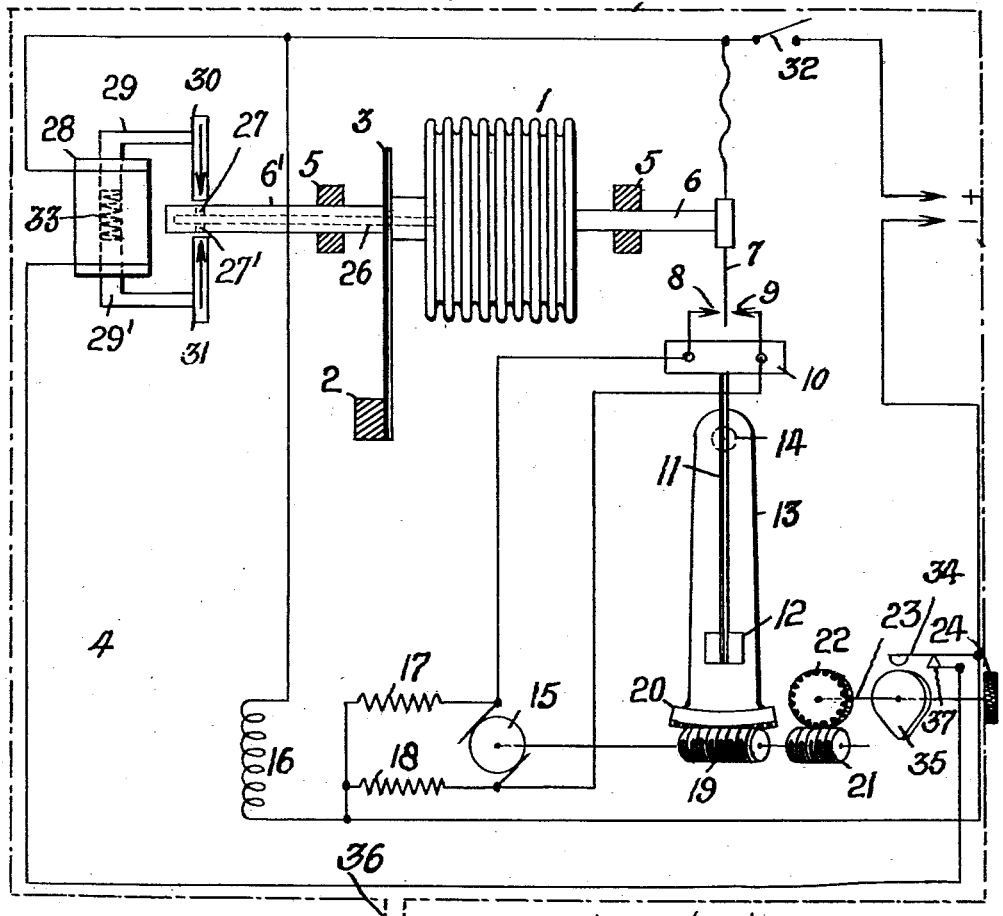
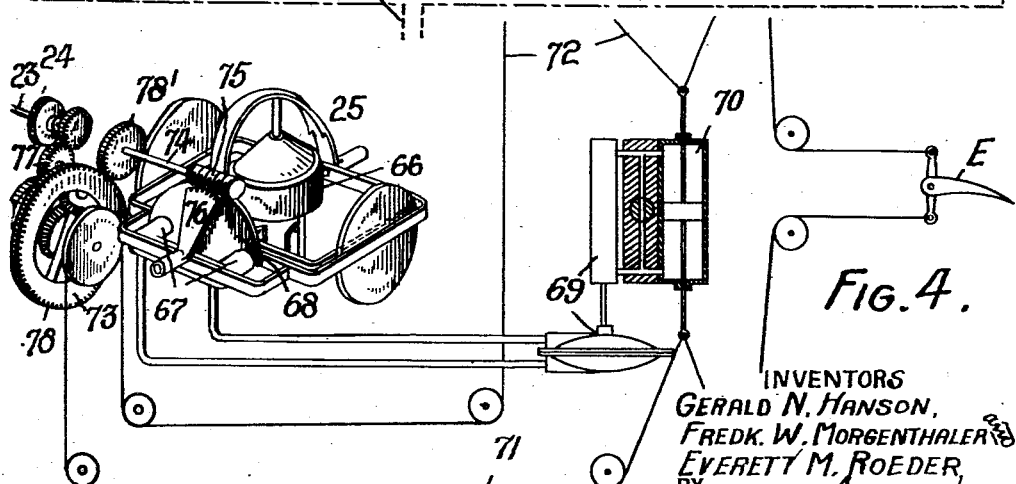
INVENTORS
GERALD N. HANSON,
FREDK. W. MORGENTHALER
EVERETT M. ROEDER
BY Herbert H. Thompson
ATTORNEY Sept. 26, 1944. G. N. HANSON ET AL 2,358,803
TEMPERATURE COMPENSATED BAROMETRIC CONTROLLER
Filed Oct. 30, 1940    2 Sheets-Sheet 2

INVENTORS
GERALD N. HANSON,
FREDK. W. MORGENTHALER &
EVERETT M. ROEDER
BY
Herbert N. Thompson
ATTORNEY.

Patented Sept. 26, 1944

2,358,803

UNITED STATES PATENT OFFICE 2,358,803

TEMPERATURE COMPENSATED BAROMETRIC CONTROLLER

Gerald N. Hanson, Allendale, N. J., and Frederick W. Morgenthaler, Brooklyn, and Everett M. Roeder, Merrick, N. Y., assignors to Sperry Gyroscope Company, Inc., Brooklyn, N. Y., a corporation of New York Application October 30, 1940, Serial No. 363,458

19 Claims. (Cl. 244—76)

This invention relates to barometric means for automatically maintaining uniform flight altitude in an automatically piloted airplane. Ordinary barometers have not proved successful for this purpose. According to our invention, a resilient bellows or expansible container is employed which is normally open to the atmosphere, but which is sealed whenever the aviator desires to cut in the automatic altitude device. In this manner, the barometric means may be made quite sensitive to small changes in altitude so that a switch or other control means may be actuated for changes in altitude of ten feet or less.

Since such type of barometric means is designed for very small changes of pressure, it is likely to be damaged if left closed during large changes in altitude. We therefore provide an automatic means for opening the bellows in case the change of altitude approaches the danger limit.

In such a barometer, temperature changes also cause large errors and we therefore provide a novel temperature compensating means which should not affect the zero or neutral setting when the device is not in operation, unless compensation is needed for expansion and contraction of the metallic portions of the device.

Referring to the drawings, showing several forms our invention may assume,

Fig. 1 is a diagram illustrating a form of our invention employing two thermostats for compensation.

Fig. 4 is a diagram showing the connection of the device with an automatic pilot.

Figure 2:
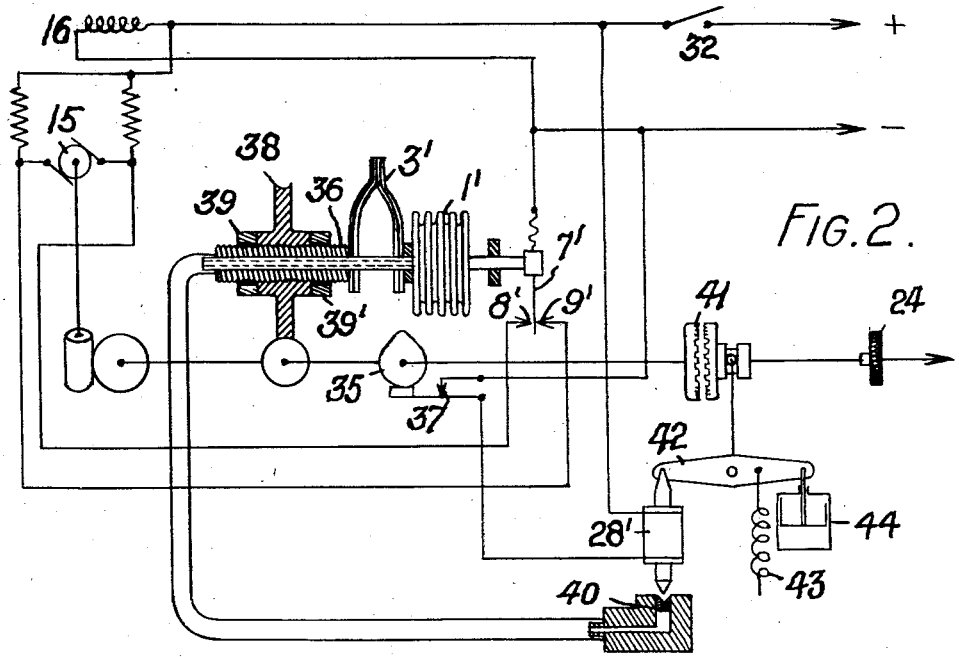
Fig. 2 is another form of the invention employing but a single thermostat.

Referring first to Fig. 1, a resilient metallic bellows or expansible container of the self-centralizing type is shown at 1, being rigidly attached to one end of a bi-metallic thermostatic strip 3 which is secured to a mounting bracket 2 on the main base plate 4. Short shafts 6 and 6' extend from each movable end wall of the bellows, which shafts are slidably mounted in guide bearings 5, 5 also mounted on said base 4. The shaft 6 is shown as carrying a movable contact 7 adapted to be moved between closely positioned contacts 8 and 9 or other form of pick-off device on a base 10 so that in case the bellows expands or contracts from its normal neutral position, one or the other pairs of contacts will be closed. Base 10 is also mounted on a bi-metallic thermostatic strip 11 clamped at its lower end between ears 12. In order to provide a follow-back action, said ears are shown as secured to an arm 13 pivoted at 14 and adjustably positioned from a follow-up motor 15 controlled by the aforesaid contacts 7, 8 and 9.

The motor 15 is shown as having a continuously excited field 16 and two resistors in series 17 and 18 across the armature, each resistor being also individually in series with one of the contacts 8 or 9. The motor is thus driven in either direction, depending on the position of the contacts. The motor is shown as turning the arm 13 through a worm 19 engaging a worm sector 20 on the end of the arm. The motor also drives through a second worm 21 and worm wheel 22 a shaft 23 leading to the altitude knob 24 on the gyro-vertical or other level maintaining means 25 on the automatic pilot (Fig. 4). By this means the elevator control surface E is turned, when the altitude departs from the desired altitude, until the proper altitude is restored and at the same time a follow-back connection to the contacts is provided.

Fig. 4 is intended to illustrate the automatic elevator control of a conventional automatic pilot, such as shown in the prior patent to E. A. Sperry, B. G. Carlson and M. F. Bates, #1,992,970, dated March 5, 1935, for Hydropneumatic automatic pilot. According to this system, the elevator is controlled from some form of artificial horizon or gyro-vertical 66 through differential pick-off air ports 67 positioned adjacent a cut-off disc 68 connected to be actuated by the gyroscope. The angular position of the ports is shown as adjusted from knob 24 on the above described shaft 23 which drives one arm of differential 73 through pinions 77. The ports control a pneumatic hydraulic relay valve 69 which governs the hydraulic servomotor 70 to position the elevator E. A follow-back connection through wires 71 and 72 is shown from the servo motor to the opposite arm differential 73, the middle arm being geared through gears 78 and 78' to the shaft 74 carrying the worm 75 which meshes with the worm sector 76 to which the aforesaid ports 67 are connected.

As stated above, the interior of the bellows is normally open to the atmosphere, but is sealed when the device is operating. This may be effected by connecting the interior of the bellows to the interior of the box 4 through a bore 26 in the shaft 6'. Said bore is shown as open to the interior of the box through lateral ports 27 and 27'. Upon excitation of an electromagnet 28, however, by closing operating switch 32 the two armatures 29 and 29' are drawn inwardly, thus clamping the open ends of the arms 30 and 31 against the ports 27 and 27', thus sealing the barometer and at the same time clamping tube 6' to prevent its lateral movement within bearing 5. Therefore, upon excitation of the solenoid 28, only the shaft 6 can move in response to change of air pressure, and at the same time any compensating action of the thermostatic strip 3 is prevented. Also, at the same time the bellows is sealed.

When, however, the operating switch 32 is open, the solenoid 28 is deenergized and the C-shaped arms 30 and 31 are opened by compression spring 33, thus opening the ports and releasing the end of the rod 6'. Under these conditions, therefore, both thermostatic strips 3 and 11 are operative. Strips 3 and 11 are designed to have an equal temperature expansion coefficient, so that under these conditions there is no relative motion between the bellows and the switches even though the temperature varies when the machine is shut down. The reversing switch 7, 8, 9 is therefore always centralized when the switch 32 is off and therefore the latter may be turned on with no preliminary adjustments. As soon as the switch 32 is closed the compensation of thermostat 14 becomes fully effective due to the locking of rod 6' to which thermostat 3 is attached.

In order to protect the sensitive bellows from damage in case the aviator fails to open switch 32 when the automatic pilot is shut off, we provide a second switch 34 which is normally biased to closed position but which is opened automatically in case the bellows expands or contracts more than a predetermined amount. A cam 35 on shaft 23 may serve this purpose which opens contacts 37 whenever base 10 is moved more than a predetermined movement in one direction or the other.

It is of course appreciated that there is little use in compensating for expansion of the bellows and its parts while neglecting the expansion of the frame on which the various elements are mounted. Instead of endeavoring to compensate for the latter, we prefer to construct the support 4 and all parts directly carried thereby, such as brackets 2 and 5 and the bracket supporting shaft 14, of an alloy the temperature coefficient of which is substantially negligible, such as 36% nickel-steel.

It is also important that the interior of the housing be responsive to the true atmospheric pressure outside the airplane, and therefore we prefer to enclose the entire device in a sealed casing 4' which is connected to Pitot static line through pipe coupling 36.

In the form shown in Fig. 2, the bellows 1' is rigidly attached to one end of the bi-metallic thermostatic element 3', the other end of element 3' being attached to a hollow threaded shaft 36 which is threaded within a rotatable worm wheel 38 journaled between brackets 39 and 39'. The worm wheel 38 is rotated from the motor 15 as before, and in this case the contacts 8' and 9' may be fixed since both the follow-up and temperature compensating actions are applied directly to the bellows at all times through the follow-up action of the worm wheel 38 in screwing the worm shaft in and out as it rotates, which shaft acts through the thermostatic element 3' on the bellows. In this case the solenoid 28' also operates to close the vent port 40, when excited. At the same time it is shown as closing a clutch 41 through a bell-crank lever 42 with which it is connected against the action of a spring 43.

In order to prevent the device from coming into action with the contacts in a decentralized position, we provide a means for preventing the closing of the vent and of clutch 41 until the contacts are centralized. To this end, we provide a dash-pot 44 which delays the first two actions until the motor 15 has had time to respond if one or the other contact is closed, and to run the worm wheel 38 until the contact is opened and the device centralized. In this case the safety switch is again shown at 37, being operated from cam 35, as before.

Figure 3:
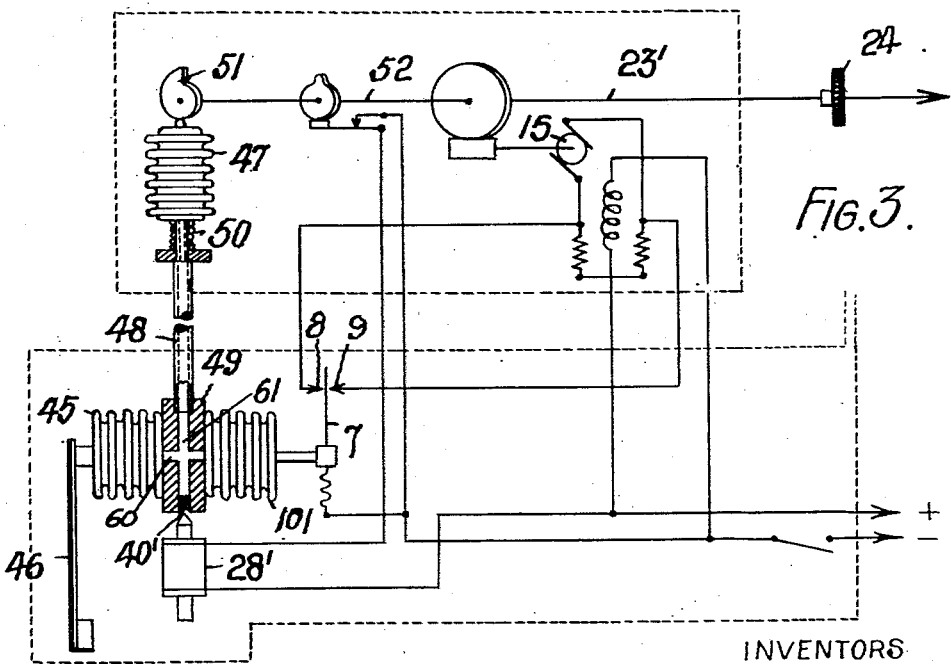
Fig. 3 is still a third form of the invention which is now preferred, employing a single thermostat and in which the temperature compensation and the follow-back from the servo motor are effected by direct variation of the air pressure within the bellows, instead of by mechanical differentials.

In the form shown in Fig. 3, the motor 15 is again operated from the reversing contacts 7, 8, 9 as in the other two forms. Instead, however, of connecting the follow-back and/or temperature compensating means to mechanically move the bellows, as in Fig. 2, or to mechanically move both the contacts and bellows, as in Fig. 1, we prefer in this instance to introduce such elements by changing the air pressure within the sensitive bellows 101 itself. To this end, we have shown the interior of the bellows or expansible container 101 not only as connected through a solenoid controlled valve or port 40' to the atmosphere, but also as connected to a secondary bellows or expansible container 45 controlled by a bi-metallic temperature compensating strip 46 and also to a third bellows 47 controlled by the follow-back action from the motor 15. This may be conveniently accomplished by providing the fixed base 49 of bellows 101 with intersecting channels or bores 60 and 61 interconnecting all three bellows and also port 40'. Since the interior of bellows 45 and 101 are connected together, it will be evident that any volumetric change in the bellows 45 will result in a change in the air pressure in bellows 101, but this will only occur when port 40' is closed. In other words, when the barometric bellows 101 is open, the thermostatic compensator is also inoperative, and it cannot affect the centralized position of the contacts 7, 8, and 9 until 40' is closed. The bellows 47 is shown as having one end yieldingly supported by a spring 50 and the opposite end pressed against a cam 51 on the shaft 52 driven from the motor 15. The volumetric capacity of the bellows 47 therefore varies in accordance with the position of the shaft 52, thereby varying the pressure within the bellows 101 to furnish the follow-back action.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic height control for aircraft, a normally inoperative barometric bellows normally opened to the atmosphere, a support, a pick-off device brought into action by relative movement of the bellows and its support from a neutral or centralized position, means for sealing said bellows at will, and means for temperature compensating said device only when said bellows is sealed, whereby said temperature compensating means may not decentralize said device when inoperative.

2. In an automatic height control for aircraft, a normally inoperative barometric bellows normally opened to the atmosphere, a support, a pick-off device brought into action by relative movement of the bellows and its support from a neutral or centralized position, means for temperature compensating said bellows and device, means for sealing said bellows, a normally inoperative servomotor for centralizing said pick-off, and means for causing said motor to be actuated from said pick-off prior to sealing said bellows.

3. A temperature compensated barometric controller comprising a resilient bellows adapted to be sealed to the atmosphere and having a part displaced by changes in atmospheric pressure, a second resilient bellows in communication therewith, and a thermostatic strip connected to said last named bellows to vary the volumetric capacity thereof with temperature changes.

4. In an automatic height control for aircraft, a resilient bellows adapted to be sealed to the atmosphere and having a part displaced by changes in atmospheric pressure, a controller actuated by movement of said part, a servomotor controlled thereby, a second resilient bellows in communication with the first bellows, and follow-back means from said servomotor for varying the volumetric capacity of said last named bellows.

5. In an automatic height control for aircraft, a resilient bellows adapted to be sealed to the atmosphere and having a part displaced by changes in atmospheric pressure, a controller actuated by movement of said part, a servomotor controlled thereby, a pair of other resilient bellows also in communication with said first bellows, a thermostatic strip positioned against one of said pair, and a follow-back connection from the servomotor to the other of said pair of other bellows.

6. In an automatic height control for aircraft, a normally inoperative barometric bellows normally opened to the atmosphere, a support, a pick-off device brought into action by relative movement of the bellows and its support from a neutral or centralized position, means for temperature compensating said bellows and device, means for sealing said bellows, a normally inoperative servomotor for centralizing said pick-off, means for energizing the system, and means for delaying the sealing of the bellows until said servomotor has centralized said pick-off.

7. In an automatic height control for aircraft, a normally inoperative barometric bellows normally opened to the atmosphere, a support, a pick-off device brought into action by relative movement of the bellows and its support from a neutral or centralized position, means for sealing said bellows at will, means for temperature compensating said device, and means for preventing said temperature compensating means from decentralizing said device when the device is inoperative.

8. In an automatic height control for aircraft, a normally inoperative barometric bellows normally opened to the atmosphere, a support, a pick-off device brought into action by relative movement of the bellows and its support from a neutral or centralized position, means for sealing said bellows at will, temperature compensating means connected to said pick-off, a second temperature compensating means connected to said bellows, and means for paralyzing said second means when said bellows is sealed.

9. In a barometric altitude controller for aircraft, a sensitive barometric bellows having a limited range movement and an opening to the atmosphere, a valve for sealing said opening, solenoid-operated means for actuating said valve and automatic means responsive to expansion or contraction of the bellows beyond said limited range for deenergizing said solenoid and thereby opening said valve.

10. A sensitive barometric bellows for aircraft as claimed in claim 9, wherein said automatic means includes a controller operated from expansion and contraction of the bellows, a servomotor controlled thereby, and a limit switch in circuit with said solenoid and opened by more than a predetermined revolution of the servomotor in either direction from its normal position.

11. A barometric controller for aircraft comprising a resilient bellows having a valve for opening and closing the same to the atmosphere, a control element displaced by said bellows on changes in atmospheric pressure, a second bellows in communication with the first bellows, a servomotor operated from said controller, and follow-back means from said servomotor for changing the volumetric displacement of said second bellows.

12. A follow-up device comprising a control element sensitive to temperature changes, a switch contact carried by said element, a follow-up element carrying cooperating contacts, means controlled by said contacts for actuating said follow-up elements to follow-up said control elements, and means for compensating said control element for temperature changes including thermostatic means for causing all said contacts to move equally in response to temperature changes.

13. A follow-up device comprising a control element, the position of which is responsive to changes in a condition but which is also sensitive to temperature changes, a follow-up element, means for actuating said follow-up element to follow said control element, and means for compensating said control element for temperature changes including thermostatic means for preventing the operation of said actuating means solely in response to temperature changes.

14. A barometric altitude device comprising a sensitive barometric bellows, pick-off or control elements relatively moved by expansion or contraction of said bellows, and temperature compensating means, including a temperature responsive element and means for mounting said bellows on said element, for preventing actuation of said pick-off by temperature changes alone.

15. A barometric altitude device for aircraft comprising a resilient barometric bellows adapted to be sealed from the atmosphere, a support, thermostatic means for mounting one end of said bellows on said support, a switch contact operated by movement of the other end of said bellows with respect to said support, a follow-up mechanism for said contact comprising a follow-up element, a pair of further switch contacts cooperating with said first contact, further thermostatic means for mounting said pair of contacts on said element, whereby upon change of temperature each of said thermostatic means will move its respective contacts by like amounts so that the relative positions of said contacts remain unchanged, means responsive to relative motion between said one end and said pair of contacts for moving said follow-up elements into correspondence wtih said one contact, solenoid operated means for sealing said bellows and fixing one end of said bellows whereby expansion of said bellows due to altitude changes will correspondingly operate said follow-up element while expansion due to temperature changes will move said one contact and said pair of contacts equally so as to leave said follow-up element unchanged.

16. An altitude device as in claim 15 further comprising means for controlling the altitude of said craft by said follow-up element.

17. A barometric altitude device comprising a resilient barometric bellows, a support, means for mounting one end of said bellows on said support, a switch contact operated by the other end of said bellows, a follow-up mechanism for said contact comprising a follow-up element, a pair of further switch contacts cooperating with said first contacts, thermostatic means for mounting said pair of contacts on said element whereby upon change in temperature the motion of said one contact due to thermal-expansion of said bellows will be equal to that of said pair of contacts due to said thermostatic means whereby said follow-up mechanism is not effected by change in temperature alone.

18. A control device responsive to pressure changes, comprising an expansible container, one part of which is moved by such changes, a reversible controller actuated by such movement, a reversible power means controlled by said controller, a second expansible container having its interior in communication with the interior of the first expansible container, and a follow-back means driven by said power means for varying the capacity of said second container to restore the pressure within the first container to substantially its original value.

19. A barometric controller for aircraft comprising an expansible container, a control element displaced by said container on changes in atmospheric pressure, a second expansible container in communication with the first container, a servomotor operated from said controller, and follow-back means from said servomotor for changing the volumetric displacement of said second expansible container.

GERALD N. HANSON.
FREDERICK W. MORGENTHALER.
EVERETT M. ROEDER.